No. 649,494. Patented May 15, 1900.
G. W. SUES.
AQUARIUM.
(Application filed Jan. 20, 1899.)
(No Model.)
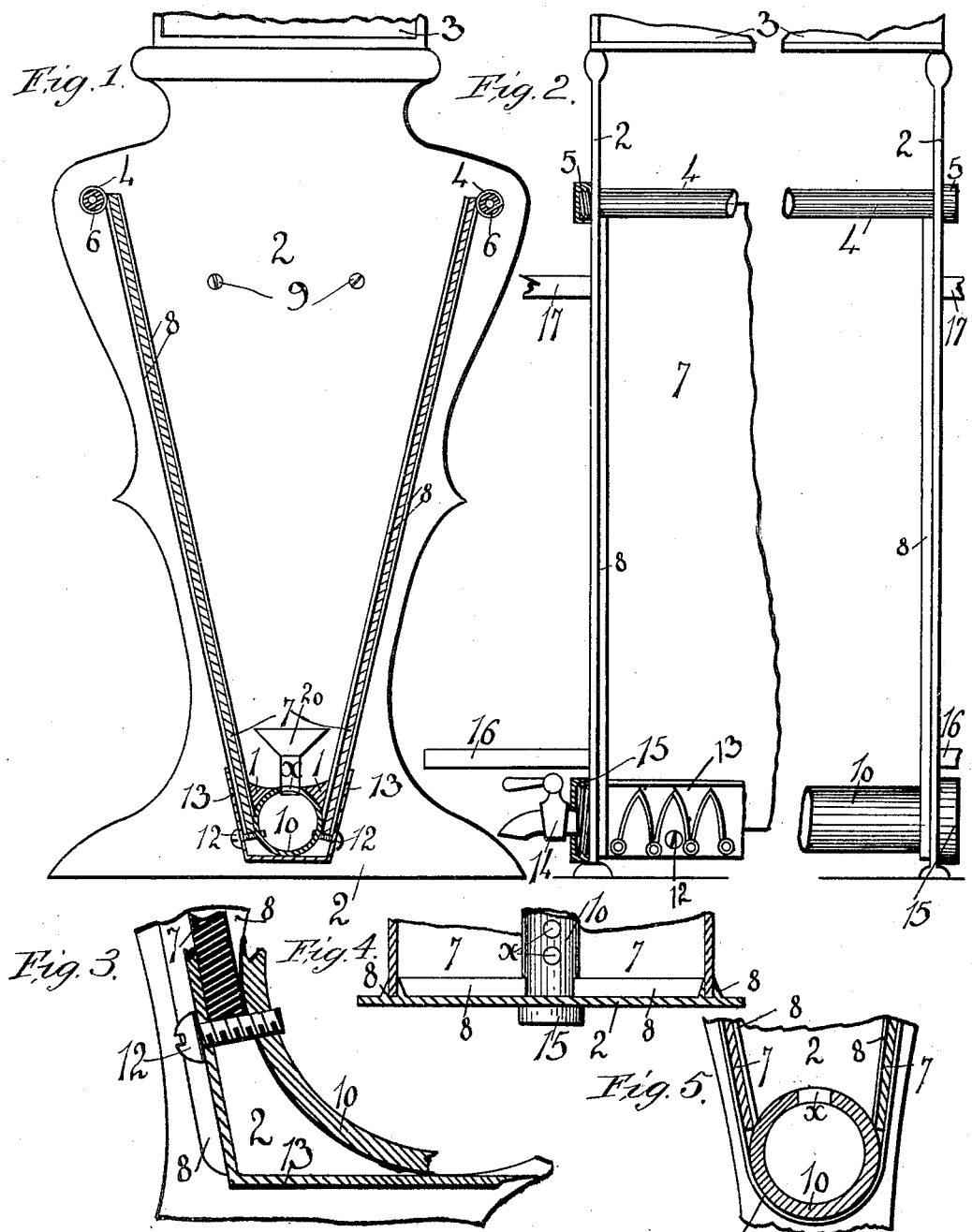
WITNESSES:
M. Clarey.
M. A. Dodsworth.
INVENTOR
George W. Sues

UNITED STATES PATENT OFFICE.

GEORGE W. SUES, OF OMAHA, NEBRASKA.

AQUARIUM.

SPECIFICATION forming part of Letters Patent No. 649,494, dated May 15, 1900.

Application filed January 20, 1899. Serial No. 702,779. (No model.)

*To all whom it may concern:*

Be it known that I, GEORGE W. SUES, residing at Omaha, in the county of Douglas and State of Nebraska, have invented certain useful Improvements in Aquariums; and I do hereby declare that the following is a full, clear, and exact description of the invention, such as will enable others skilled in the art to which it appertains to make and use the same, reference being had to the accompanying drawings, which form a part of this specification.

This invention relates to an improved combination aquarium and flower stand.

The object of my invention is to provide an aquarium that will not foul and in effect be self-cleaning, and furthering the aim of my invention the same comprises an aquarium having two communicating compartments, an upper aquarium proper and a lower auxiliary compartment, serving as a settling-chamber, within which the impurities collect and settle, leaving the water within the aquarium proper clean and free from impurities. The aquarium is further provided with a number of shelves adapted to receive flower-pots or plant-boxes.

In the accompanying drawings I have shown in Figure 1 a central sectional view of an aquarium embodying my invention with portions broken away. Fig. 2 shows a side elevation with portions broken away. Fig. 3 shows an enlarged broken detached detail disclosing the relative position of the pipe and projecting ribs. Fig. 4 shows a sectional top view with portions removed, while Fig. 5 shows a slight modification, in which the outer supporting-ribs are shown as united.

The great and only objection to aquariums as usually built is that the residuum or humus collects over the bottom of the aquarium and unless periodically removed fouls the aquarium, which results in time in breeding objectionable parasites or indirectly killing the fish. The operation of cleaning and resetting the aquarium is a time-consuming task, and the handling of the plants and fish is apt to injure or kill the same. In order to overcome this objection, I employ two similar end panels 2 of any desired width or material, which panels may be given an artistic shape in outline, as well as having both the inner and outer surfaces suitably embellished. These panels are used in sets of twos and form the ends of my aquarium, while two glass sheets or panes 7 form the sides, the perforated pipe 10 serving as the bottom for my aquarium. In referring to Fig. 1 it will be noticed that the glass plates 7 7 are held in V shape between suitable ribs 8 8, which are made an integral part of the panel. These panels 2, made either in sheet or cast metal or any other suitable material, are further provided with two openings near the upper end and adjacent to the termination of the ribs 8, while a third larger opening is placed within the lower end of the panel at a point between the two inner ribs 8, as is shown. The bottom of my aquarium comprises a pipe 10 of a length exceeding the length of the glass plates 7 and the combined thickness of the two panels 2 and is provided with an alined series of perforations $x$, as is shown in Fig. 4, and has its ends threaded, as will be noticed in referring to Fig. 2, to receive the end caps 15 15. This tube 10 fits snugly within the lower portion of the panel and acts as a stay-rod in uniting the two end panels 2 at their lower ends in conjunction with the caps 15. At the upper ends I have two pipes 6, which may be provided with embellished casings 4, which unite the panels at the upper ends, these pipes 6 being threaded at each end and adapted to receive the ordinary caps 5, as is shown in Fig. 2. These pipes 6 are so positioned that when the glass plates 7 are inserted the plates terminate adjacent to the tube 10, as is shown in Fig. 1, and rest against the pipes 6, as is shown. From this it will be noticed that my invention embodies, essentially, two end panels, two glass plates, a bottom drain-pipe, acting as a stay-rod, and two upper connecting-pipes.

In constructing my aquariums I find that in the smaller sizes but one upper stay-tube need be employed, which I place in the center of the panel and immediately above the lower perforated drain-tube. In these smaller sizes I also find it unnecessary to connect the glass plates in any way to the perforated drain-tube, which forms the bottom of my aquarium. However, in sizes where the glass plates 7 range in depth from twenty (20) to forty-five (45) inches I find it necessary to secure the lower edge, where the greatest water-pressure comes, to the drain-tube 10, and so also in order to provide a support adapted to sustain the glass plates at the upper edge in resisting the water-pressure I so position the upper stay-tubes 6 that one point of their peripheral surface comes in contact with the upper edge of the glass plates 7, as is disclosed in Fig. 1. Then, again, I find that where an ordinary iron pipe 10 is used and in order to hide the unsightly cement, by means of which a water-tight union is insured between the glass plates and the tube 10, an embellished shield 13, of bronze, wood, or any other suitable material, may be nicely held in position by the screws 12, which are made to thread into suitable openings within the drain-pipe 10, as is disclosed in Fig. 1. These screws 12 are placed at suitable points, so that the glass plates are absolutely fixed to the tube. In Fig. 2 I have shown the relative position of the embellished strip 13 and the screw 12. To the sides of these panels 2 may be secured at suitable points shelves 16 and 17, adapted to hold suitable flower-pots, while the two panels above are nicely adapted to receive the shelf or flower-box 3, as is disclosed. Now as the bottom of my aquarium is very much narrower than the top all the impurities naturally gravitate toward the narrow bottom and either immediately fall through the openings $x$ into the drain chamber or pipe 10 or collect upon the bottom of the aquarium, which bottom is made to slope toward the openings, as is shown in Fig. 1. The fish as they seek their food naturally swim to the bottom of the aquarium and there agitate the water, so that all heavier particles which have collected there are agitated until they come over one of the openings $x$, so that the fish actually appear to sweep the bottom of their aquarium to precipitate the impurities into the basement or drain-chamber in communication with the aquarium.

In my aquarium I further provide a very narrow sheet of water; but this sheet is correspondingly deep, so that the fish can always be nicely seen, and, further, the plant life within the aquarium can be nicely studied, as everything is brought so clearly into view. The sides formed by the two glass plates being at an angle further provide a prismatic effect, which is very novel and adds to the attractiveness of the aquarium.

In order to drain the aquarium, I provide the drain-tube 10 at a suitable point with an ordinary water-cock 14, which is made large enough so that when it is opened the water rapidly sweeps through the drain-tube and so carries out all the collected impurities. This cock, however, is not absolutely necessary, as the drain-tube can be easily emptied by the ordinary siphon method.

By means of my peculiarly-constructed aquarium the water within the aquarium proper is continually kept clean and free of impurities, while the humus, so destructive to fish life, can be instantly removed. A further advantage embraced in my aquarium is that in cleaning the bottom of the same the fish need not be disturbed in any way, so that they do not injure their scales or tear the delicate fins, which is quite essential when paradise fish and Japanese fan and fringe tails are in the aquarium.

If it is desired to fill the bottom of the aquarium with sand, I prefer using a small metallic funnel 20, which snugly fits into the pipe-openings $x$ and extends a suitable distance upward, and the distance between the top of the funnel and the bottom of the aquarium regulates the depth of the sand to be placed within the aquarium. When these little funnels are used, a lesser amount of holes in the bottom are necessary, as the funnels have a greater area above and so more quickly gather the descending impurities.

I find that is not absolutely necessary to use the perforated tube 10, as a slate or sheet-metal bottom can be used, with converging sides. Into such an aquarium I simply place a perforated tube, which is removable within the aquarium and which collects the material precisely as in the structure just described. It is always, however, essential that the glass plates diverge as they rise in order to provide a suitable amount of water. I further find that a very fine effect is produced in covering one of the diverging sides with a coating of cement to represent the rough surface of a lake or ocean bottom, the cement before drying being strewn or covered with sand and shells and provided with recesses within which plants may find a rooting. Arranged in this manner I prefer positioning the transparent panel in a vertical position and allowing the opaque or covered side to extend at an angle. In cutting the sides in the shape of a trapezoid the end panels can also be made to extend in a position other than vertical.

It is of course understood that a very narrow rectangular aquarium could be built, within the bottom of which could be placed a receptacle to provide a settling or collecting chamber for the aquarium proper. The effect, however, would not be as striking as when the plates are set at an angle to one another. I further find that in the smaller-sized aquariums when I use a removable drain-tube but one stay-rod need be used, as the end plates 2 can be securely united with but one rod, so that in its simplest form my aquarium would comprise two end panels, two glass plates, one stay-rod, and a removable drain-tube held within the V-shaped bottom.

Having thus described my said invention, what I claim as new, and desire to secure by United States Letters Patent, is—

1. In a receptacle of the class described, the combination of the five following instrumentalities, to wit: two side panels united along one edge, V shape, two end panels adjacent opposite ends of said side panels, and a stay-rod extending from one of said end panels to the other with means to unite said end panels to said stay-rod to impinge said two side panels V shape between said two end panels.

2. The combination of two end panels, of two sides held at an angle to one another between said panels, a stay-rod to connect said panels to impinge said sides between the same, and a perforated chamber held within the angle formed by said sides.

3. The combination of two end panels, of a perforated stay-tube to connect said panels at one end, two sides diverging from said perforated stay-tube, and a stay-rod to connect said panels at the opposite end to impinge said sides between said end panels.

4. The combination with two panels, of a perforated stay-tube securing said panels at one end, two sides diverging from said perforated tube, and a stay-rod positioned adjacent to the outer edge at the upper end of each of said sides to unite said panels, said sides being impinged between said panels.

5. The combination with two panels, of a perforated stay-tube securing said panels at one end, of a drain-cock extending from said perforated tube, two sides diverging from said perforated tube, and a stay-rod positioned adjacent to the outer edge at the upper end of each of said sides to unite said panels.

6. The combination with two end panels, of a perforated drain-tube uniting said panels at one end, two sides extending at an angle from said perforated stay-tube, stay-rods positioned adjacent to the upper ends of said sides and connecting said panels and means to connect said sides to said perforated stay-tube.

7. As a new article of manufacture, an aquarium comprising an upper chamber, or aquarium proper, a lower communicating settling-chamber and a plurality of open-ended tubes extending a suitable distance upward from said settling-chamber, into said upper chamber.

GEORGE W. SUES.

In presence of—
CHARLES L. THOMAS,
MABEL A. DODSWORTH.